May 25, 1954 — H. J. CRINER — 2,679,274
BREAD CUTTER

Filed July 30, 1951 — 2 Sheets-Sheet 1

INVENTOR.
Harry J. Criner

May 25, 1954    H. J. CRINER    2,679,274
BREAD CUTTER
Filed July 30, 1951    2 Sheets-Sheet 2
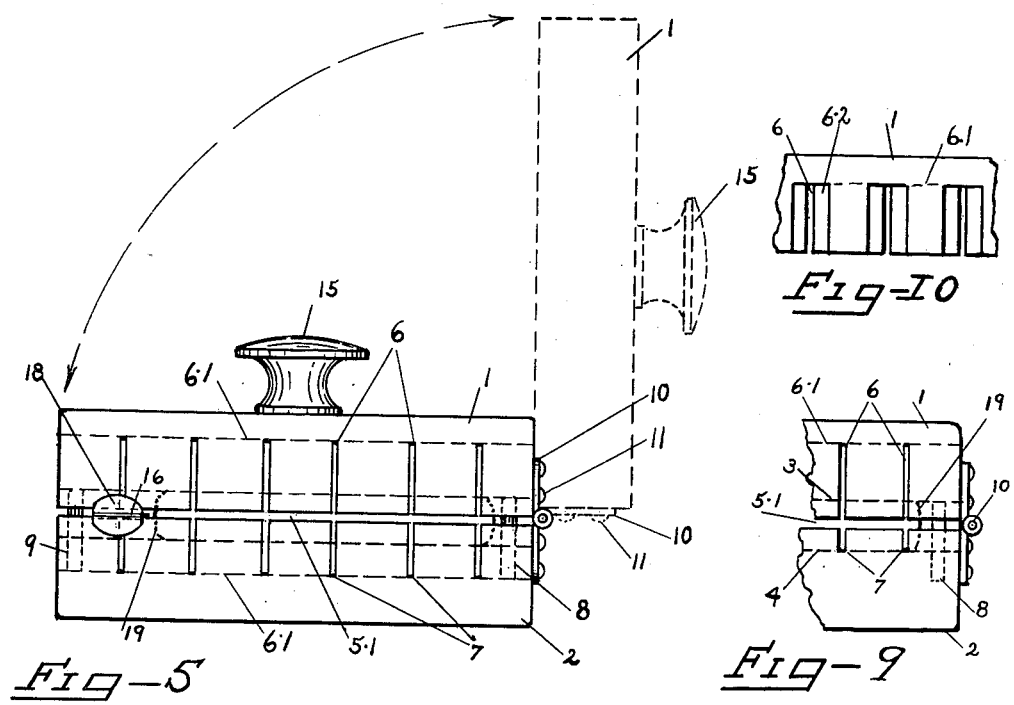
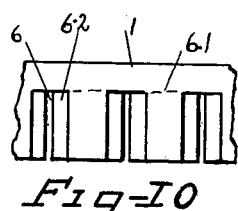
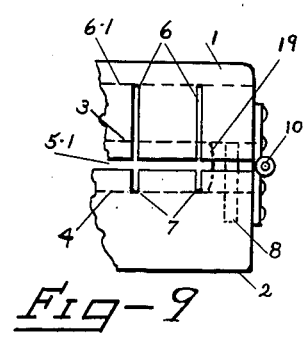
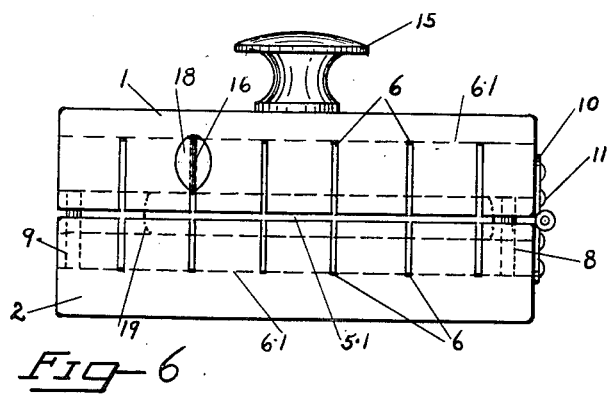
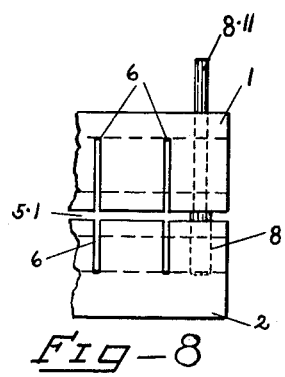
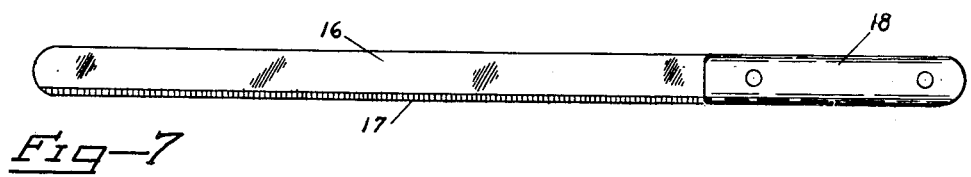
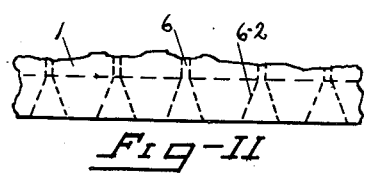
INVENTOR.
Harry J. Criner Patented May 25, 1954

2,679,274

UNITED STATES PATENT OFFICE 2,679,274

BREAD CUTTER

Harry J. Criner, Kissimmee, Fla., assignor of one-half to A. G. Bush, Davenport, Iowa Application July 30, 1951, Serial No. 239,351

1 Claim. (Cl. 146—150)

My invention relates to an improvement in bread cutters.

The objects of my invention are to provide an implement for home use in cutting ordinary slices of bread into very thin slices for use in making dainty sandwiches, hors d'oeuvres and similar foods for ladies' tea parties, etc. and which may be used also for cubing bread in small quantities to be toasted for croutons; to provide such an implement which will be simple, economical, handy and safe.

I accomplish these objects by the means illustrated in the accompanying drawings, in which—

Figure 5 is a side elevation showing the upper block raised up into open position and showing the knife 16 in place between the upper and lower blocks;

Figure 6 is a side elevation showing the knife in one of the slots of the upper block in position for cubing the bread;

Figure 7 is a side elevation of one form of the knife;

Figure 8 is a fractional elevation of an alternate form of blocks in which the upper block is mounted upon vertical rods instead of being hinged to the lower block;

Figure 9 is a fractional side view of the apparatus closed;

Figure 10 is a fractional side view showing the outer ends of the slots 6 expanded to facilitate introduction of the knife therein;

Figure 11 is a fractional top detail showing in dotted lines the form of slots shown in Figure 10.

Figure 2:
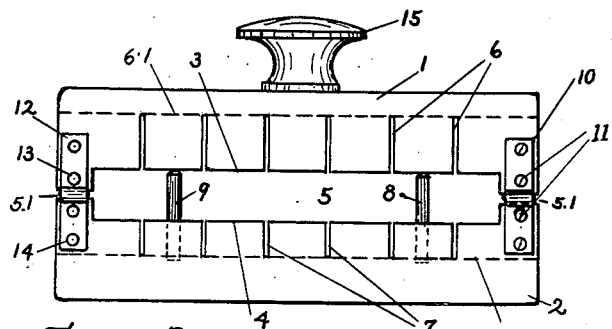
Figure 2 is a rear elevation.
Figure 1:
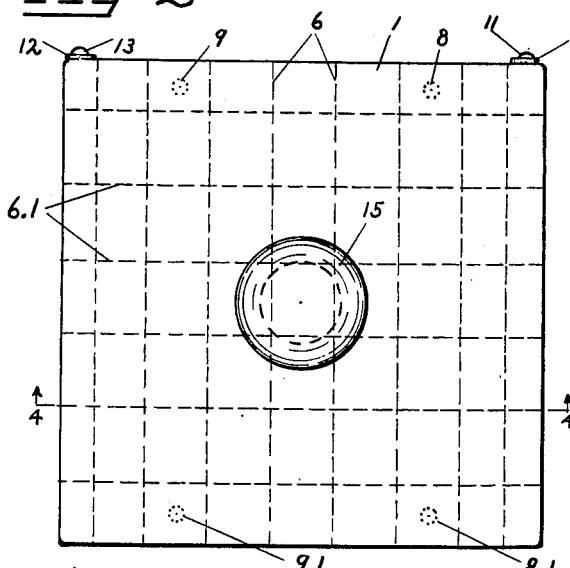
Figure 1 is a top or plan view of my apparatus, but without showing the cutting knife.
Figure 3:
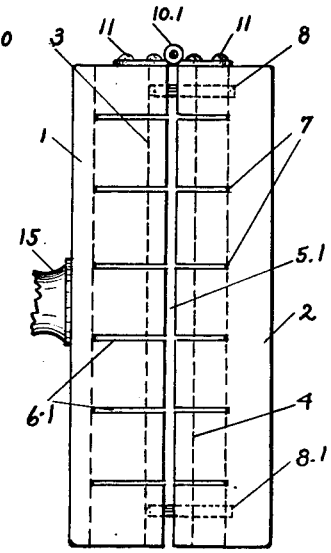
Figure 3 is a side view of Figure 1 from the right.
Figure 4:
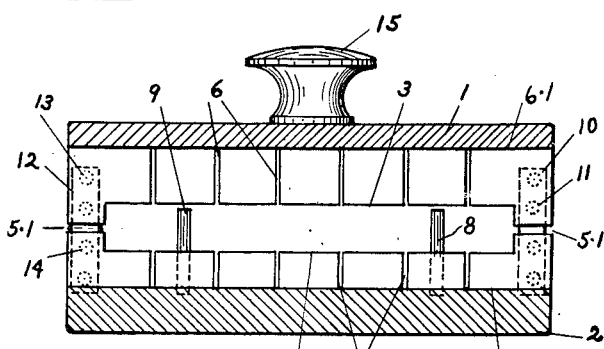
Figure 4 is a sectional view on the line 4—4 of Figure 1.

My apparatus comprises a pair of blocks which may be of wood, plastic or other suitable material in rectangular form. The block 1 is united to the lower block 2 by hinges 10, 12 or in the alternate form shown in Figure 8, may be mounted upon posts 8.11, the lower ends of which are fixedly secured in the block 2 and upon which the block 1 may slide up or down upon the upper end.

The hinges may be secured to the blocks by screws or brads 11, 13, 14 or any suitable form of fastening. The posts 8 and 9 are rigidly mounted in the rear portions of the block 2 and the upper ends of the posts bear against the block 1 so as to space it at the desired distance from the block 2 and to act as stops for the knife 16. Corresponding posts 8.1 and 9.1 are secured in the front edge of the block 2 to form stops for the block 1 and secure it at the proper spacing from the block 2.

The adjacent faces of blocks 1 and 2 are cut away to form a chamber 5 corresponding in height to the thickness of slices of bread desired to be re-sliced therein.

In the use of this slicer for re-slicing bread, a slice of bread is placed in the chamber. The block is then lowered into its closed position and the knife 16 is inserted in the open space between the side members of the blocks with the handle 18 projecting. A slice of bread 19 is shown in dotted lines and is held firmly in position while being re-sliced by the knife 16.

The knife 16 is a very thin sharp steel knife and may have either a straight or serrated cutting edge as desired. When the slice has been re-sliced, the knife is withdrawn, the upper block 1 raised, and the two slices removed as desired.

With bread sliced to the ordinary thickness of $\frac{1}{8}$ to $\frac{1}{2}$ an inch, the re-sliced halves will be approximately $\frac{1}{4}$ of an inch in thickness and will form very attractive sandwiches, hors d'oeuvres, etc. because of their delicacy and daintiness.

The side members of the blocks 1 and 2 and the front members of said blocks are provided with slots 6 and 7 of sufficient width to permit the entrance of the knife 16 and the outer ends of the slots may be expanded as shown in Figures 10 and 11 in order to facilitate entrance of the end of the knife 16 therein.

The slots 6 in the upper block extend far enough upwardly so as to make room for the knife 16 above the slice of bread 19. When it is desired to cut an ordinary slice of bread into cubes for croutons, the slice is placed in the holder as described and the knife 16 is then operated through the slots from side to side and from front to rear to cut the bread into cubes.

When the alternate form is used, the upper block 1 is slidably mounted upon the upper end of the rod or post 8.11, the lower end being rigidly mounted in the block 2. This will permit the block 1 to be raised so that one or two additional slices of bread may be placed in the bread chamber and cubed simultaneously. If more than one slice of bread is cubed at a time, the knife may be inclined so as to be held in the vertical position by the slots on opposite sides of the blocks.

The free end of the knife is blunt and rounded as shown in Figure 7 so as to facilitate its entrance into the slots 6 which may be expanded at their outer ends as shown.

A knob 15 is preferably united to the block 1 to assist in raising it.

Various modifications may be made in the size, material and proportions of the parts without departing from the spirit of my invention as set out in the claim and I do not limit my claim to the precise form shown.

I claim:

An appliance for re-slicing ordinary slices of bread comprising corresponding upper and lower blocks of wood or other suitable material secured in closely spaced relation but far enough apart to permit a thin cutting knife to be operated between them, the blocks being provided with an inner chamber corresponding generally to the length, breadth and thickness of one or more slices of the bread to be re-sliced, both blocks being provided with a plurality of corresponding inner lengthwise and transverse slots arranged at right angles and of sufficient width to permit the operation of a cutting knife therein, the slots in the upper block being of sufficient height to allow a slicing knife to be introduced therein above a slice of bread lying in the chamber, the upper block being slidably mounted upon posts rigidly mounted in the lower block whereby it may be raised to accommodate two or more slices of bread simultaneously.

References Cited in the file of this patent

UNITED STATES PATENTS

| Number | Name | Date |
| --- | --- | --- |
| 920,345 | Kolodziej | May 4, 1909 |
| 1,098,941 | Collins | June 2, 1914 |
| 1,318,038 | Willis | Oct. 7, 1919 |
| 2,089,980 | Owen | Aug. 17, 1937 |
| 2,172,538 | Katzinger | Sept. 12, 1939 |
| 2,206,154 | Bixler | July 2, 1940 |
| 2,477,493 | Olson | July 26, 1949 |